(12) United States Patent
Bendapudi et al.

(10) Patent No.: US 7,653,684 B2
(45) Date of Patent: Jan. 26, 2010

(54) ENABLING INTER-SUBSYSTEM RESOURCE SHARING

(75) Inventors: Perraju Bendapudi, Hyderabad (IN); Kiran Akella Venkata, Redmond, WA (US); Anu Engineer, Kerala (IN); Rajasekhar Khandrika, Hyderabad (IN); Rajesh Jalan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/004,620

(22) Filed: Dec. 3, 2004

(65) Prior Publication Data

US 2006/0168588 A1 Jul. 27, 2006

(51) Int. Cl.
G06F 15/16 (2006.01)
(52) U.S. Cl. .................. 709/203; 709/204; 719/310; 719/317; 719/328; 719/331
(58) Field of Classification Search .................. 709/203, 709/204; 719/310, 317, 328, 331
See application file for complete search history.

(56) References Cited

U.S. PATENT DOCUMENTS

| | | | |
|---|---|---|---|
| 5,423,042 A | 6/1995 | Jalili et al. | |
| 6,067,577 A * | 5/2000 | Beard | 719/331 |
| 6,192,418 B1 | 2/2001 | Hale et al. | |
| 6,601,110 B2 | 7/2003 | Marsland | |
| 6,604,123 B1 | 8/2003 | Bruno et al. | |
| 6,665,735 B1 * | 12/2003 | Tanaka et al. | 719/331 |
| 6,964,051 B1 * | 11/2005 | Palaniappan | 719/317 |
| 7,028,305 B2 * | 4/2006 | Schaefer | 719/310 |
| 2004/0068733 A1 | 4/2004 | Longbardi | |
| 2005/0114870 A1 * | 5/2005 | Song et al. | 719/328 |
| 2006/0123432 A1 | 6/2006 | Bendapudi | |

FOREIGN PATENT DOCUMENTS

EP 1186317 3/2002

OTHER PUBLICATIONS

European Search Report, Oct. 10, 2007, Application 05110529.4-1243.
Noer, Geoffrey, "Cygwin32: A Free Win32 Porting Layer for UNIX® Applications," Proceedings of the 2nd Usenix Windows NT Symposium, Aug. 3, 1998, pp. 1-8.
Walli, Stephen R., "INTERIX™: UNIX® Application Portability to Windows NT™ via an Alternative Environment Subsystem," Proceedings of the Usenix Windows NT Workshop in Seattle, Aug. 1997, pp. 1-12.

* cited by examiner

Primary Examiner—Jinsong Hu
(74) Attorney, Agent, or Firm—Perkins Coie LLP

(57) ABSTRACT

Techniques for enabling inter-subsystem resource sharing are provided. A subsystem executing an application ("app subsystem") receives resources from another subsystem providing a resource ("resource subsystem"), such as a DLL. Then, when an application of the app subsystem is executed, the application may request a resource from the app subsystem, such as a DLL. The app subsystem, upon determining that the requested resource is associated with the resource subsystem, may communicate with the resource subsystem to request the resource. The resource subsystem may then load the resource. When the application utilizes the resource to perform an activity, such as by invoking a method of the DLL, the app subsystem may communicate with the resource subsystem to request the resource to perform the activity. The resource subsystem may provide an indication of a result to the resource subsystem upon completing the activity.

20 Claims, 5 Drawing Sheets

ENABLING INTER-SUBSYSTEM RESOURCE SHARING

TECHNICAL FIELD

The described technology relates generally to operating systems and, more particularly, to enabling inter-subsystem resource sharing.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may provide functionality to application programs using subsystems. A subsystem is an operating system component that implements an operating system's application program interfaces ("APIs"). Subsystems may invoke functions of a kernel component. A kernel component is an operating system component that provides core operating system functions.

An operating system may comprise multiple subsystems, each exposing different operating system behaviors. As an example, an operating system may implement a portable operating system interface ("POSIX") and a MICROSOFT WINDOWS interface as two separate subsystems. These subsystems may both function on a common operating system. Such an operating system may function both with applications designed for POSIX and applications designed for MICROSOFT WINDOWS.

However, applications designed for one subsystem may not share resources designed for another subsystem. As an example, a POSIX application may be unable to load a dynamic link library ("DLL") designed for MICROSOFT WINDOWS. Similarly, a MICROSOFT WINDOWS application may be unable to load a DLL designed for POSIX. To enable a DLL designed for a subsystem to function with another subsystem, a developer could rebuild the DLL for the other subsystem. However, rebuilding a DLL may require source code relating to the DLL. The source code may be unavailable when, e.g., the DLL is provided by a software vendor.

As an example, a customer having a UNIX-based application may wish to make the application function with MICROSOFT WINDOWS. This application may have a portion developed by the customer and a portion provided by a software vendor, such as a database software vendor. The customer could then move the portion it developed to POSIX as an intermediate step to moving its applications to MICROSOFT WINDOWS. However, although the software vendor may make available its portion for MICROSOFT WINDOWS as a DLL, it may not make its portion available for POSIX. Because the POSIX portion of the customer's application cannot use the software vendor's DLL designed for MICROSOFT WINDOWS, the customer's application may not fully function with the POSIX subsystem. The customer may thus be less inclined to move its applications to MICROSOFT WINDOWS. It would thus be highly desirable to enable inter-subsystem resource sharing

DETAILED DESCRIPTION

Figure 1:
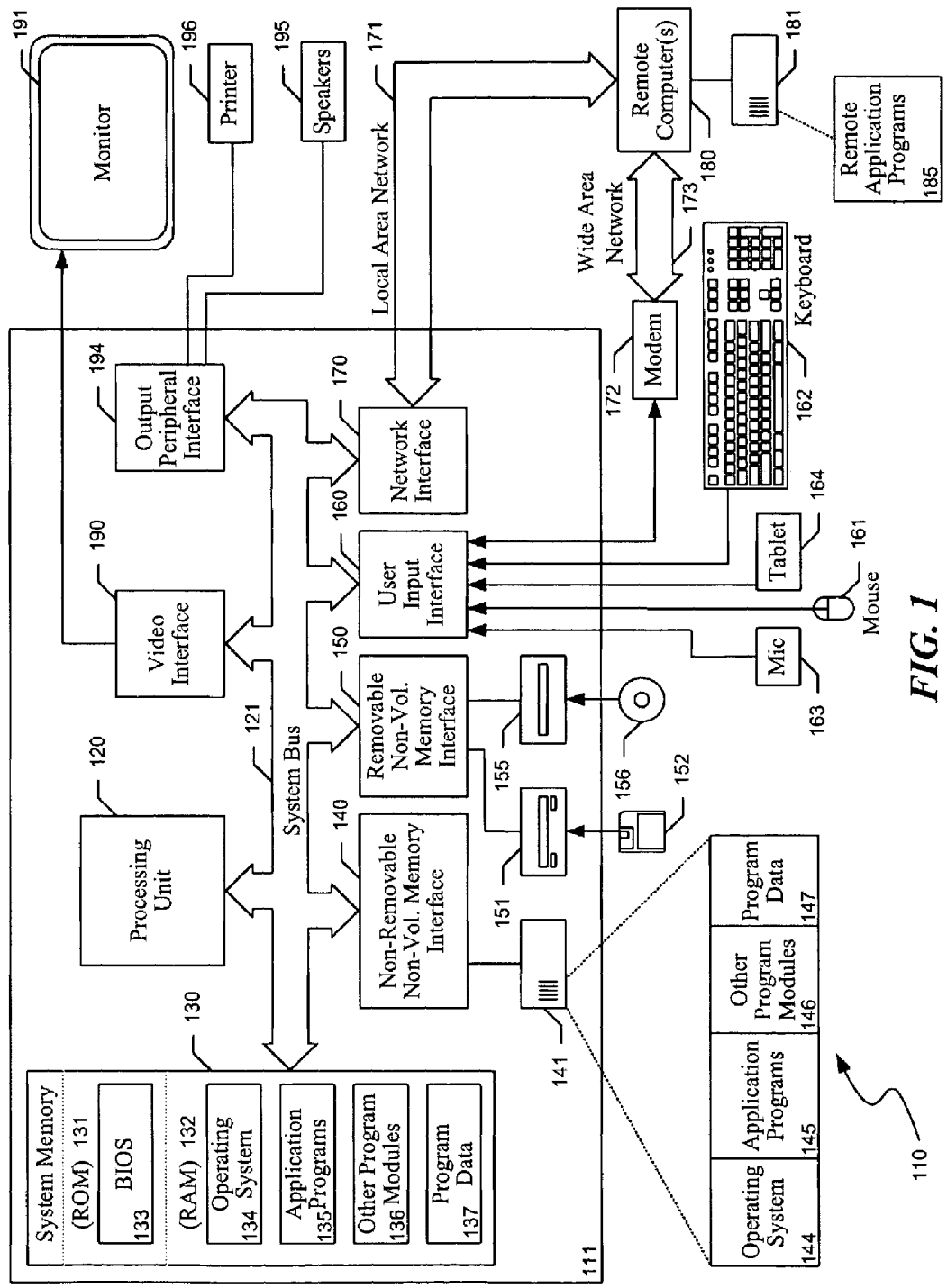
FIG. 1 is a block diagram illustrating an example of a suitable computing environment in which the techniques may be implemented.

Techniques for enabling inter-subsystem resource sharing are provided. In various embodiments, a subsystem executing an application ("app subsystem") receives resources from another subsystem providing a resource ("resource subsystem"), such as a DLL. The subsystems may be enabled to function with one another. Then, when an application of the app subsystem is executed, the application may request a resource from the app subsystem, such as a DLL. The app subsystem, upon determining that the requested resource is associated with the resource subsystem, may communicate with the resource subsystem to request the resource. The resource subsystem may then perform some initial housekeeping activities and load the resource. When the application utilizes the resource to perform an activity, such as by invoking a method of the DLL, the app subsystem may communicate with the resource subsystem to request the resource to perform the activity. The resource subsystem may provide an indication of a result to the resource subsystem upon completing the activity. Thus, a subsystem may share a resource designed for another subsystem. In various embodiments, the application may utilize the resource directly after the resource subsystem performs the initial housekeeping.

Resource sharing between subsystems may involve using facilities that are common to the subsystems. As an example, both the POSIX subsystem and the MICROSOFT WINDOWS subsystem have "C" runtimes ("CRTs"). CRTs may be one or more statically linked libraries with commonly used functions. Application developers sometimes use statically linked libraries with applications. When a library is statically linked by an application, it becomes a part of execution code of the application. An application developer migrating an application to another operating system may need to use functions provided by various libraries, such as a library designed for MICROSOFT WINDOWS and another library designed for POSIX, and so may link these libraries. Linking is performed to convert object code emitted by a compiler into executable code. When multiple libraries are linked, and these libraries have method names in common, errors may result. As an example, both libraries may provide a "print" function. When both libraries are linked, the conflict will cause errors. There are at least three ways to resolve these errors. One solution is to remove duplicate names by changing the names in one or both of the libraries. Another solution involves using DLLs. DLLs may be guaranteed to have their own namespace. That is, a method of a DLL is identified by the DLL that provides the method. As a result, when an application invokes a method of a DLL, the name of the method (as identified with the DLL) cannot conflict with the name in a statically linked library or another DLL. A third solution is to create a statically linked library that provides a unified namespace that is a superset of functions in both libraries. Methods common to multiple statically linked libraries would only be provided once in the superset library. When the method names are identical but the methods receive different parameters or provide different functions, the different methods may be invoked by an application by identifying the methods specifically, such as by providing a flag. Thus, it is possible to avoid name conflicts despite sharing resources across subsystems.

Turning now to the figures, FIG. 1 illustrates an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136 and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162 and pointing device 161, commonly referred to as a mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
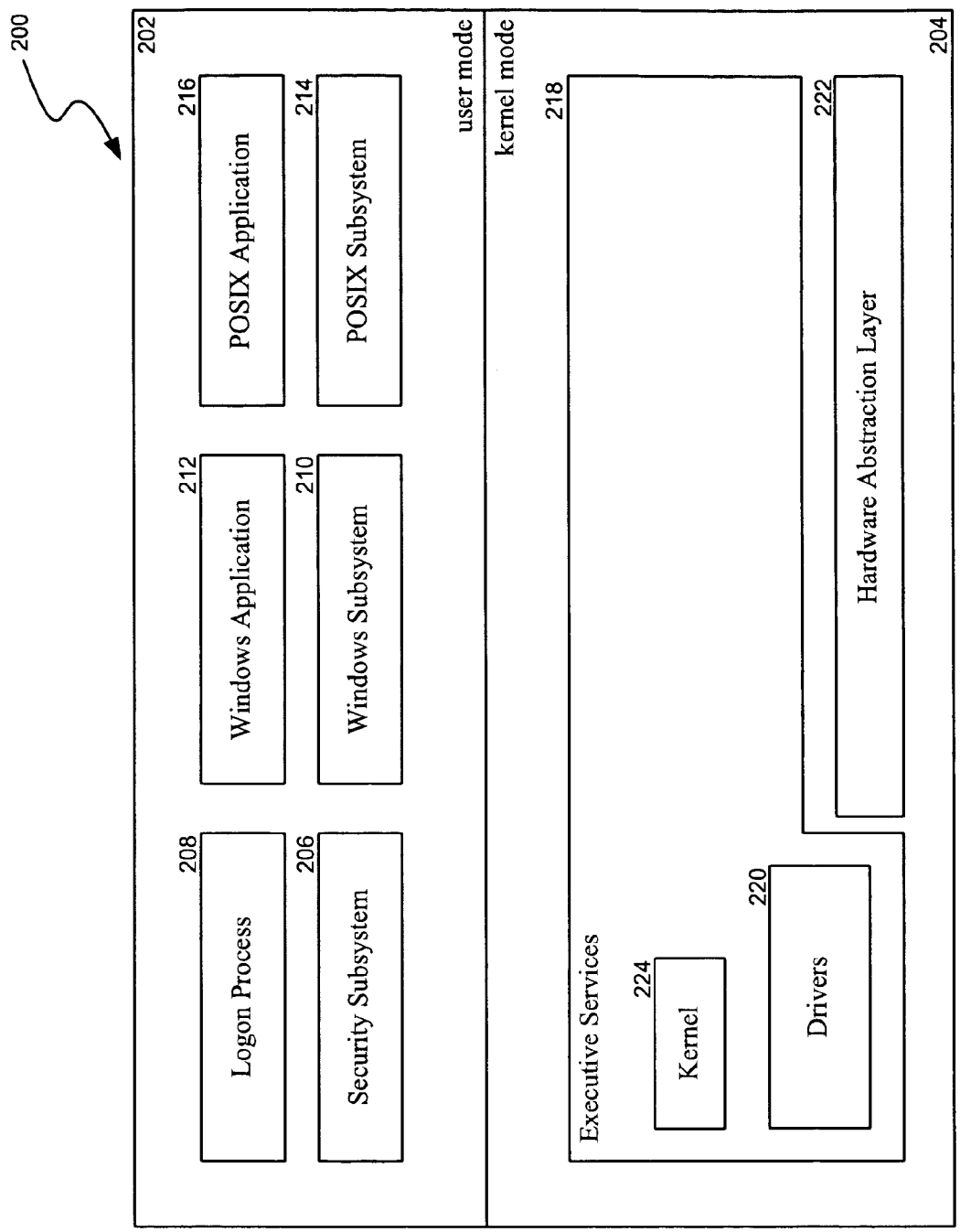
FIG. 2 is a block diagram illustrating components of an operating system.

FIG. 2 is a block diagram illustrating components of an operating system. The operating system 200 comprises multiple components operating in a user mode 202 and a kernel mode 204.

Components operating in a user mode include, e.g., a security subsystem 206, logon process 208, WINDOWS subsystem 210, WINDOWS application 212, POSIX subsystem 214, and POSIX application 216.

The security subsystem provides security services to applications and the operating system. As an example, the security subsystem may provide a logon process 208 and functionality to enable users to log on to the operating system.

The WINDOWS subsystem may provide MICROSOFT WINDOWS functionality to applications, such as WINDOWS applications. The WINDOWS subsystem may implement an application program interface relating to the MICROSOFT WINDOWS operating system. As an example, the WINDOWS subsystem may receive a request made by a WINDOWS application to an API of the WINDOWS subsystem, perform some activities relating to the request, and call an operating system kernel to perform remaining activities.

The operating system may also have additional subsystems, such as a POSIX subsystem 214. The POSIX subsystem may implement an API relating to an operating system that complies with a POSIX specification. The API may be used by a POSIX application 216 to communicate with the POSIX operating system to perform tasks.

When an operating system comprises multiple subsystems, it is capable of providing multiple varieties of operating systems, such as MICROSOFT WINDOWS and POSIX. Thus, applications designed for these varieties of operating systems may function on the operating system comprising multiple subsystems.

The subsystems may utilize services provided by an executive services component 218 operating in kernel mode 204. The executive services component may comprise additional components, such as drivers 220 and a kernel 224. The drivers may provide direct communications between various software and hardware components of the system. As an example, a driver may provide communications between software components and a network interface card. The kernel may provide core operating system functions and communications with a processor. As an example, the kernel may schedule thread execution by loading program registers and instructing the processor to begin executing a thread. A hardware abstraction layer 222 may also operate in kernel mode to provide operating system components and interfaces relating to hardware devices. The hardware abstraction layer may enable software components of the operating system to avoid having to provide functionality specific to a particular vendor's hardware device.

Although applications are shown as a part of the operating system, they may execute by utilizing various facilities provided by the operating system, as illustrated in FIG. 1.

Figure 3:
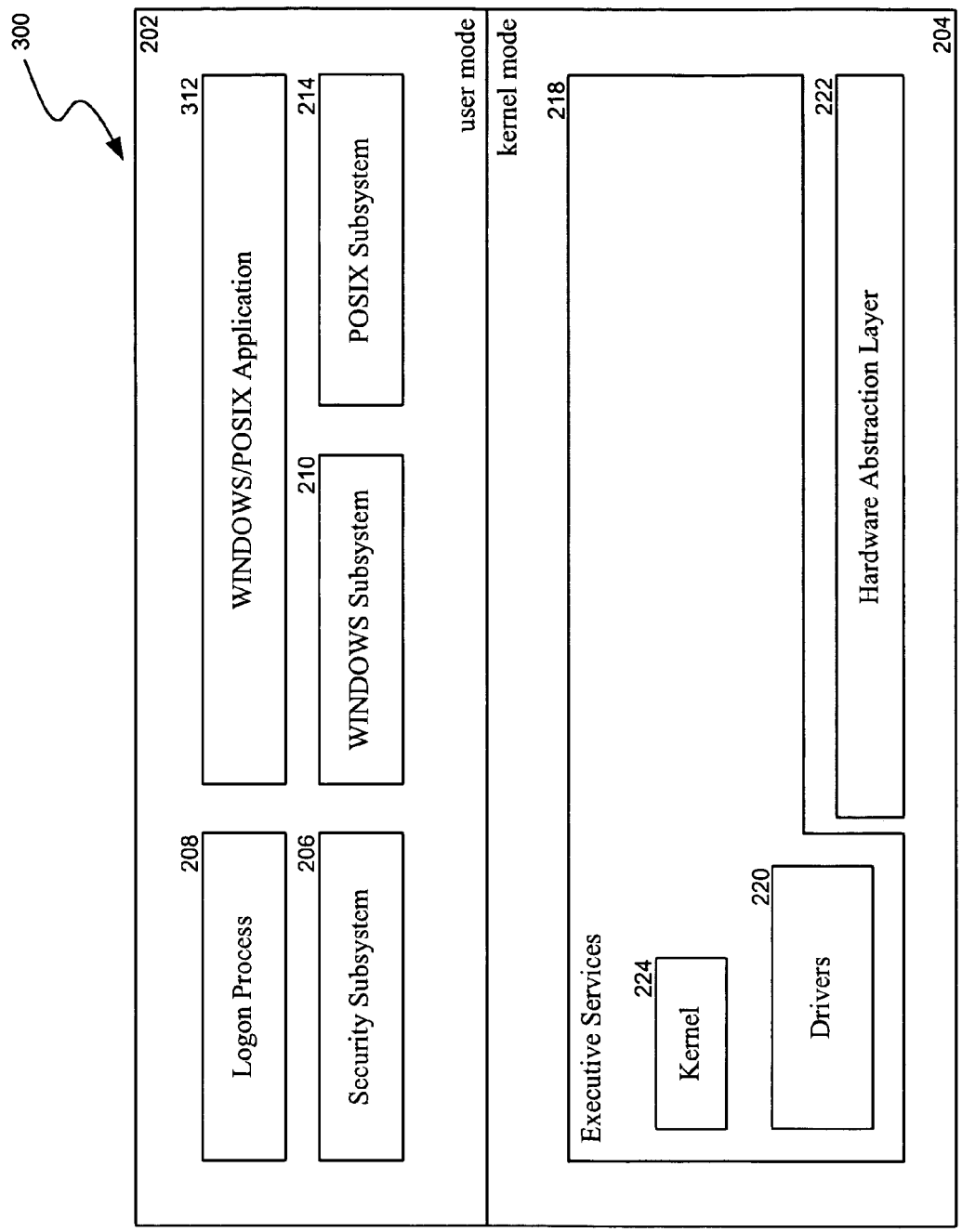
FIG. 3 is a block diagram illustrating components of an operating system having an application that utilizes services of multiple subsystems in an embodiment.

FIG. 3 is a block diagram illustrating components of an operating system having an application that utilizes services of multiple subsystems in an embodiment. In the illustrated embodiment, an application receives services from both a WINDOWS subsystem and POSIX subsystem. The application 312 may then be considered to be a WINDOWS/POSIX application. In various embodiments, the WINDOWS/POSIX application may be designed principally for one of the subsystems, e.g., WINDOWS.

A WINDOWS/POSIX application may be able to utilize resources offered by both subsystems. As an example, the WINDOWS/POSIX application may access libraries and DLLs relating to both subsystems. To enable this resource sharing, one or both of the subsystems may be modified to be able to communicate with the other subsystem. Then, when an application is executed and the application accesses a resource, the WINDOWS subsystem may determine that the resources available at the POSIX subsystem and may request the POSIX subsystem to load the resource.

Upon receiving the request to load the resource, the POSIX subsystem may first attempt to determine a list of threads relating to a process of the application that should have access to the resource. The POSIX subsystem may also provide access to the resource to additional threads created by the identified threads (e.g., newly spawned child threads). In so doing, the POSIX subsystem may implicitly trust threads of the WINDOWS subsystem relating to the application that requested the resource. To determine which threads relate to the application, the POSIX subsystem may perform a method that is described in below in relation to FIG. 5.

The architecture thus enables "mixed mode" processes, such as processes that utilize services of multiple subsystems. In this architecture, applications that do not need services from both subsystems would continue to function unmodified. These applications would use services of the subsystem for which the applications were designed.

Figure 4:
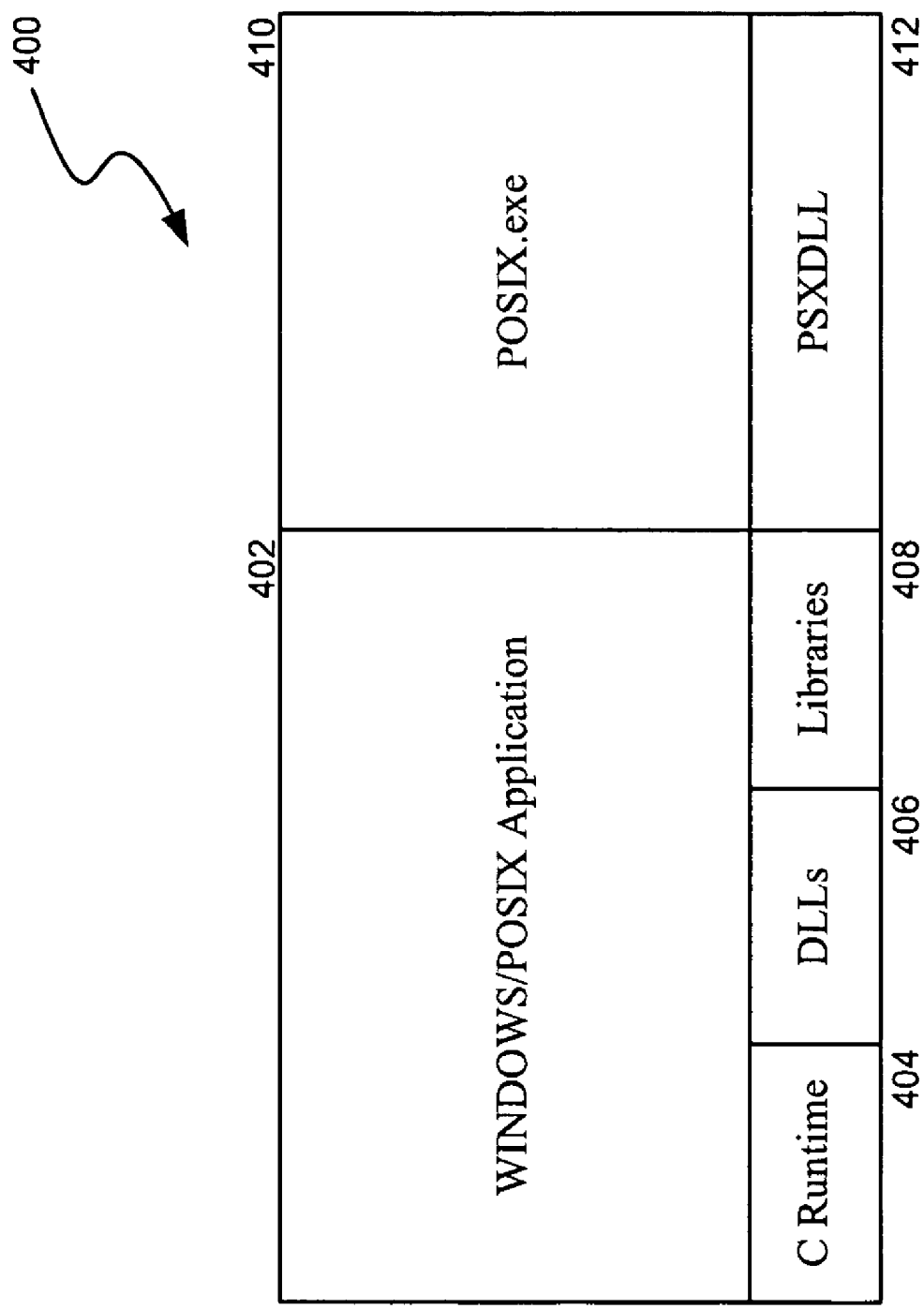
FIG. 4 is a block diagram illustrating an application in an embodiment.

FIG. 4 is a block diagram illustrating an application in an embodiment. The application may be a WINDOWS/POSIX mixed mode application. The application 402 may utilize a C run time 404, DLLs 406 and libraries 408 (e.g., statically linked libraries). As examples, the C run time may provide standard library functions, such as to allocate space in a heap; DLLs may provide interfaces to the WINDOWS subsystem, such as to render a user interface; and other libraries may provide other services, such as a third party vendor providing a utility library.

When the application needs to utilize services provided by a component of the POSIX subsystem, the application may invoke a POSIX.exe application 410. The POSIX.exe component may be written as a component that operates with the WINDOWS subsystem, but may load a PSX DLL component 412 that communicates with the POSIX subsystem to provide POSIX-related functionality. The PSX DLL component is a DLL that enables applications to invoke interfaces implemented by the POSIX subsystem. In various embodiments, the application may directly load the PSX DLL component, which may launch the POSIX.exe component.

When the POSIX.exe component is launched (either by the PSX DLL component or the application), it may query the WINDOWS subsystem for a list of threads relating to the process that requires the POSIX resource. The POSIX.exe component may then provide this list of threads to the POSIX subsystem. The POSIX subsystem would then be able to trust the threads appearing on this list and additional threads whose ancestor is indicated to be a thread on this list.

Thus, components that may originally have been related to the POSIX subsystem, such as the PSX DLL and POSIX.exe components, may be rewritten as components that utilize the WINDOWS subsystem. These components may then continue to use services provided by the POSIX subsystem.

Figure 5:
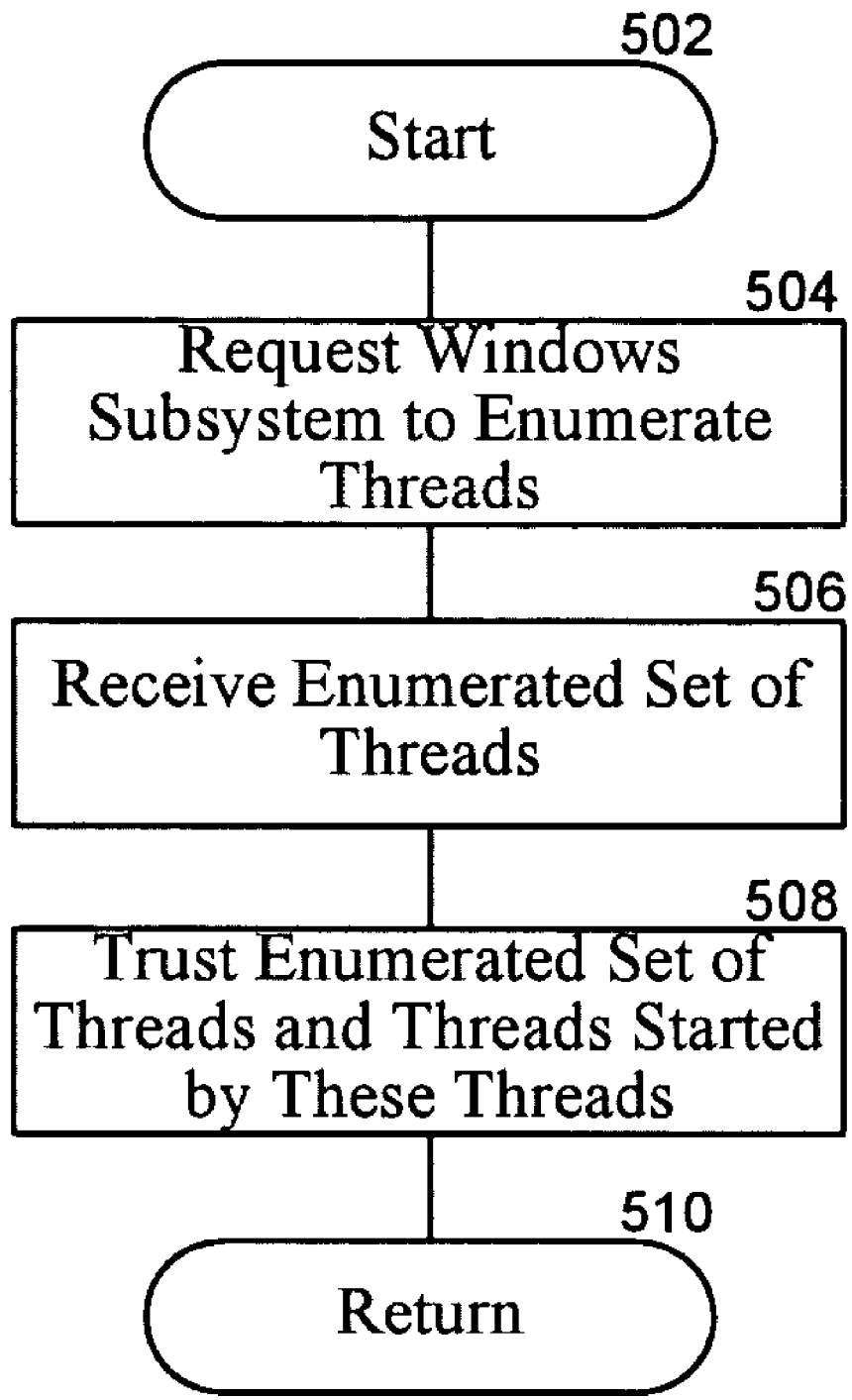
FIG. 5 is a flow diagram illustrating a routine performed by a POSIX component in an embodiment.

FIG. 5 is a flow diagram illustrating a routine performed by a POSIX component in an embodiment. The routine may be performed by a POSIX.EXE component.

The routine begins at block 502.

At block 504, the routine requests the WINDOWS subsystem to enumerate a list of threads relating to an application that has requested POSIX services. The WINDOWS subsystem is capable of enumerating all threads relating to a process.

At block 506, the routine receives the enumerated set of threads from the WINDOWS subsystem. This received list of threads may be indicated to be trusted. That is, these threads may be provided access to POSIX services, such as a DLL.

At block 508, the enumerated threads and other threads created by the enumerated threads may be trusted when they request access to a resource of the POSIX subsystem.

At block 510, the routine returns to its caller.

In a sense, a subsystem provides security to applications and threads. As an example, a process may be incapable of accessing memory or resources of another process. By enabling the POSIX subsystem to request and receive a list of trusted threads, the POSIX subsystem may extend its trust to processes and threads of the WINDOWS subsystem. Thus, the POSIX subsystem and the WINDOWS subsystem are able to share resources.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A subsystem of an operating system for enabling an application designed for the subsystem to use a facility provided by a second subsystem of the operating system, comprising:
   a processor and memory, the memory storing one or more components implemented in software;
   a component that receives a request for a resource from the application, wherein the subsystem in which the application executes provides a first operating system interface that is different from a second operating system interface provided by the second subsystem;
   a component that determines that the resource is provided by the facility of the second subsystem of the operating system;
   a component that communicates the request to the second subsystem of the operating system based upon the determination; and
   a component that, upon receiving an indication of a result for the request from the second subsystem, communicates the indication of the result to the application.

2. The subsystem of claim 1 wherein the request is communicated via a local procedure call.

3. The subsystem of claim 1 wherein the subsystem complies with a portable operating system interface specification.

4. The subsystem of claim 3 wherein the second subsystem is a version of MICROSOFT WINDOWS.

5. The subsystem of claim 1 wherein the subsystem is a version of MICROSOFT WINDOWS.

6. The subsystem of claim 5 wherein the second subsystem complies with a portable operating system interface specification.

7. The subsystem of claim 1 wherein the facility is a dynamic link library.

8. The subsystem of claim 7 wherein the resource is a method performed by the dynamic link library.

9. A method performed by a subsystem for enabling an application to share resources of multiple subsystems, the subsystem executing on a computing device having a processor and memory, comprising:
    when the application accesses under control of the processor a resource of a subsystem of an operating system,
        among the multiple subsystems, identifying a subsystem that provides the resource, wherein the subsystem that provides the resource provides a first operating system interface that is different from a second operating system interface provided by the second subsystem;
        requesting the identified subsystem to load the resource; and
        indicating to the identified subsystem to access the resource.

10. The method of claim 9 wherein the subsystem loading the resource complies with a portable operating system interface specification.

11. The method of claim 9 wherein the subsystem loading the resource is a version of MICROSOFT WINDOWS.

12. The method of claim 9 wherein the resource is a dynamic link library.

13. The method of claim 12 wherein the indicating includes communicating a method name.

14. The method of claim 13 wherein the indicating includes communicating one or more parameters.

15. The method of claim 13 wherein the communicating is performed using a local procedure call.

16. The method of claim 9 wherein the access to the resource includes an invocation of a method of a dynamic link library.

17. A computer-readable storage medium storing computer-executable instructions for performing a method that enables an application of a first subsystem to share a dynamic link library of a second subsystem, the method comprising:
    receiving from the application of the first subsystem an indication to access a method of the dynamic link library;
    requesting the second subsystem to load the dynamic link library, wherein the subsystem that indicates to access the method of the dynamic link library provides a first operating system interface that is different from a second operating system interface provided by the second subsystem; and
    indicating to the second subsystem to access the indicated method.

18. The computer-readable medium of claim 17 including enumerating a list of threads relating to the application upon receiving a request from the second subsystem.

19. The computer-readable medium of claim 18 including informing the second subsystem of a new thread relating to the application.

20. The computer-readable medium of claim 19 wherein the new thread is a child thread of a thread appearing in the enumerated list of threads.

* * * * *

UNITED STATES PATENT AND TRADEMARK OFFICE
CERTIFICATE OF CORRECTION

| | | |
|---|---|---|
| PATENT NO. | : 7,653,684 B2 | Page 1 of 1 |
| APPLICATION NO. | : 11/004620 | |
| DATED | : January 26, 2010 | |
| INVENTOR(S) | : Bendapudi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1422 days.

Signed and Sealed this

Twenty-third Day of November, 2010

David J. Kappos
*Director of the United States Patent and Trademark Office*